United States Patent Office 3,474,329
Patented Oct. 21, 1969

3,474,329
MAGNETIC RESONANCE APPARATUS USING A PROGRAMMED RADIOFREQUENCY EXCITATION
John S. Waugh, Lincoln, Mass., assignor to Massachusetts Institute of Technology, Cambridge, Mass., a corporation of Massachusetts
Filed July 31, 1967, Ser. No. 657,345
Int. Cl. G01r 33/08
U.S. Cl. 324—.5                                                   10 Claims

ABSTRACT OF THE DISCLOSURE

Conventional nuclear magnetic resonance apparatus is programmed to produce radio frequency excitation energy whose amplitude and phase is such that the effects of spin-spin interactions are averaged to a reduced value; whereas, resonance shifts, although also affected, can still be observed in the output signal. The method of operation is particularly useful for investigating solids whose dipolar interactions are large and liquids displaying complex spin-spin interactions. The method consists of adapting the coherent radio frequency modulator found in most pulsed NMR apparatus to provide a particular sequence of phase modulated pulses or alternatively to provide a phase and amplitude modulated continuous wave.

---

The invention herein described was made in the course of a grant sponsored by the National Science Foundation.

BACKGROUND OF THE INVENTION

The purpose of this invention is to provide means of observing perturbations of the natural magnetic resonance frequencies (Larmor frequencies) of gyromagnetic resonators such as nuclear, electronic and atomic magnetic moments, particularly in solids, under conditions where these perturbations would otherwise be partially or completely masked by static or nearly static magnetic spin-spin interactions ("spin-spin interactions").

Perturbations of the Larmor frequencies ("resonance shifts") have been previously observed in liquids and gases (and in solids where these perturbations are large) by means of steady-state magnetic resonance spectroscopy in which the forced coherent precession of a collection of elementary gyromagnetic elements, caused by the application of a strong, uniform, steady magnetic field, a "Zeeman field," and a weak steady radio frequency magnetic field, an "R.F. field," is detected as a function of the strength of the steady field or the value of the applied radio frequency. These perturbations also appear in the spontaneous free precessional signal which follows the application of an intense short burst of R.F. field in the presence of the Zeeman field. The resonance shifts in question include shifts variously termed "chemical shifts," "Knight shifts," "inhomogeneous shifts/broadenings," "g-shifts," all of which consist basically in deviations of the effective Zeeman field from its nominal value.

These resonance shifts are often partially or completely obscured by scalar and/or dipolar spin-spin interactions. Two methods have been employed previously to eliminate or reduce the effects of these dipolar interactions without at the same time eliminating the resonance shifts. One of these methods, described by Andrew et al., Nature (London) 182, 1659 (1958) and Kessemeier et al., Physical Review 155, 321 (1967), requires the physical rotation of the sample material at a high rate (rotation frequency greater than $T_2^{-1}$, where $T_2$ is the transverse relaxation time due to spin-spin interactions). The other, Lee et al., Physical Review, 140, A1261 (1965), employs a strong radio frequency field applied with the Zeeman field off the resonance condition by a predetermined amount.

Standard methods, other than those just referred to, suffer from the partial or complete obscuration of resonance shifts by spin-spin broadening.

The sample rotation method succeeds only when the sample rotation frequency is greater than $T_2^{-1}$. For a typical solid with $T_2 \approx 50$ μsec, this would require a rotation rate of the order of one million r.p.m. or greater. The Lee et al. method requires accurate adjustment of the relation between the shift of the applied Zeeman field from the resonant value and the strength of the applied radio frequency field. In addition the accuracy with which resonance shifts can be measured is drastically limited by the uniformity over the sample volume of the strength of the radio frequency field. Both of the latter methods, in the process of eliminating the spin-spin interactions, also lose that part of the resonant shifts which depends on the orientation of the solid with respect to the Zeeman field; i.e., the anistropy of the resonance shift.

The present method differs from previous magnetic resonance methods in that the sample is excited differently, by means of a burst of intense radio frequency field which is varied in amplitude and in phase during the burst, in such a manner that the effect of spin-spin interactions is reduced or eliminated; whereas, the resonance shifts are not. It differs from the sample-spinning method in that the sample material may be kept stationary. It differs from this and from the Lee et al. experiment in that the essential manipulations performed do not depend on the angular variation of the spin-spin interactions; and hence, unlike them, it does not result in the loss of information concerning the anisotropy of the resonance shifts.

The advantage of the invention is that it permits the measurement of small resonance shifts in magnetic resonance including the anisotropies of these shifts where these would otherwise be obscured by spin-spin interactions. This information is of value in chemical analysis. Resonance shifts are widely used for this purpose (e.g. commercial high resolution NMR spectrometer systems (Varian Associates etc.)), but these spectrometers are useful only for liquid samples.

Unlike the rotating sample method, the present invention does not require rotation of the sample. In many common materials the success of the rotating sample method would require rotation speeds of unattainable magnitude (e.g. 1,000,000 r.p.m. or greater).

In liquid samples the invention has the advantage that it achieves the reduction or elimination of the effects of scalar spin-spin interaction (i.e. it achieves so-called homonuclear spin decoupling) without eliminating chemical shifts; and thus leads to a simplified spectrum which may be more easily interpreted than the usual spectrum obtained in conventional high resolution NMR spectroscopy.

DESCRIPTION OF THE INVENTION

In this description, reference is made to the accompanying figures in which.

Figure 1:
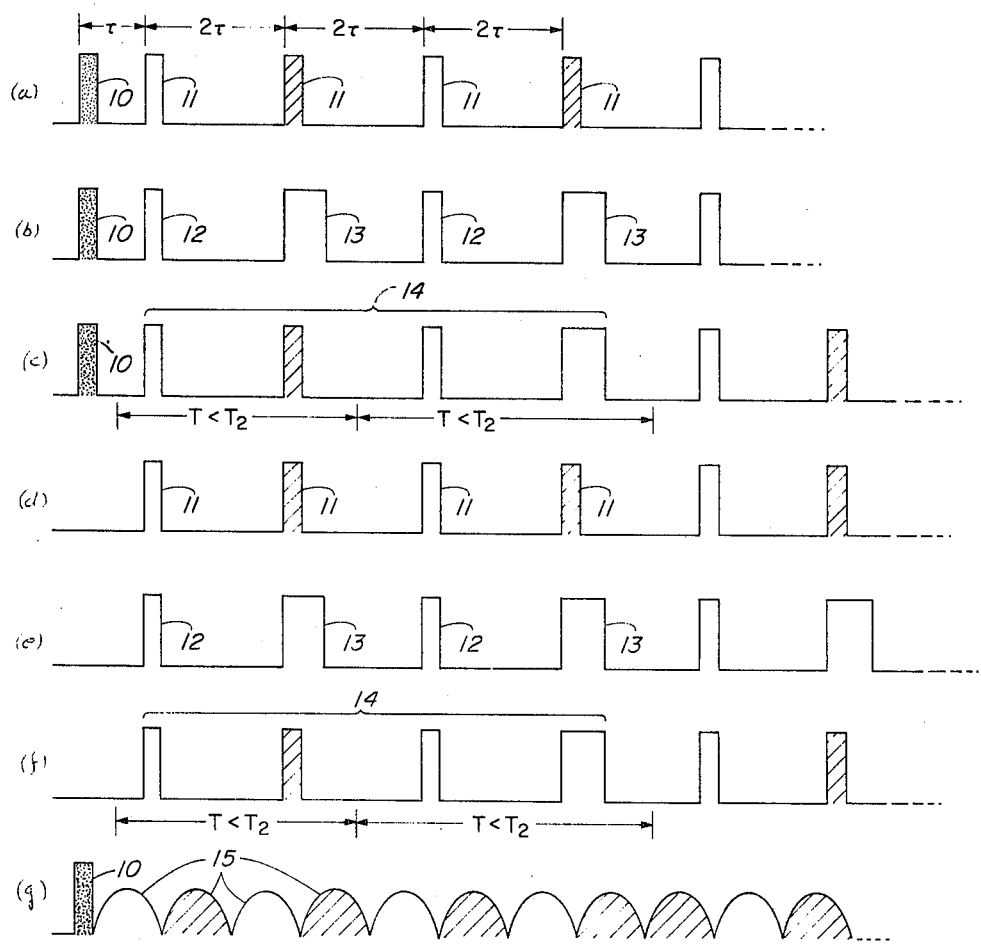
FIGURE 1 shows as a function of time, the different phase and amplitude waveform envelopes of the radio frequency excitation which is the subject of this invention.

The invention is an improvement in the art of nuclear magnetic resonance (NMR), comprising methods and means of detecting resonance shifts of NMR in samples where these would in previous methods be obscured by spin-spin interactions. We presuppose the existence of a coherent pulsed NMR spectrometer system such as the Magnion Corp., Model ELH–15; the Nuclear Magnetic Resonance Specialties Model PS–60–A, or the instrument described by Clark, Review of Scientific Instruments, 35,316 (1964). We also presuppose the adjustment, by one skilled in the art of pulsed NMR, of this spectrometer system to the conditions necessary for causing and observing transient NMR signals.

Briefly, these spectrometers provide a uniform steady magnetic field $H_0$ along one assumed axis, a pulsed coherent radio frequency field along an orthogonal axis and a magnetic field signal pickup coil along this same axis or along a third axis orthogonal to these two axes. The signal in the pickup coil resulting from the gyromagnetic resonance of a test sample of material under observation located at the intersection of said axes when under the influence of the pulsed R.F. field is detected and then applied to a cathode ray tube or other display to provide an amplitude versus time presentation. The pulsed R.F. field can be applied with a repetition period short compared to the transverse relaxation time $T_2$ of the test sample; and the time duration, amplitude and phase of the R.F. field of the individual pulses may be programmed to produce the desired rotation of the spin system. The notation used in this application to describe the rotation of the spin system and the phase of the R.F. field relative to a rotating frame of reference is that which is customary in the literature where, for example, the notation $A°_{B°}$ signifies that the R.F. pulse has a phase of $B°$ with respect to a reference phase and $A°$ signifies the degrees of rotation of the spin system in a plane orthogonal to the R.F. field direction producing the rotation.

The apparatus required for the methods of this invention differs from the abovementioned conventional pulsed NMR spectrometer systems in that it must provide the capability, absent in those spectrometer systems, of generating pulse programs satisfying the requirements of one or more of the following methods (a)–(g).

The radio-frequency pulses are now applied to the sample in the customary way, except that they are programmed in one of the following ways:

(a) A 90° initial pulse 10 followed after a time $\tau$ by a train of 90° pulses 11 separated from one another by $2\tau$, the phase of the R.F. carrier in each pulse in the train differing from the following one by 180°, and all the pulses in the train having carrier phase differing from that of the initial pulse by 90°; this pulse sequence, $90°_{90°}-90°_{0°}-90°_{180°}-90°_{0°}-90°_{180°}$ . . . is shown in FIG. 1(a);

(b) A 90° initial pulse 10 followed after a time $\tau$ by a train of $n \times 90°$ pulses 12, 13 with $n$ alternating between two integers which differ from one another by an odd integral multiple of two; e.g. a train of 90°, 270°, 90°, 270° . . . pulses; the carrier phase of all pulses in said train being the same and differing from that of the initial pulse by 90°; the complete pulse sequence $90°_{90°}-90°_{0°}-270°_{0°}-90°_{0°}-270°_{0°}-$ . . . is shown in FIG. 1(b);

(c) The same pulse sequence as (b), except that in place of a regular alternation of the values of $n$ there is a regular or irregular succession of odd positive or negative integral values of $n$ such that the total time of the pulse train can always be divided into time intervals T, which are of the same order or smaller than the characteristic transverse relaxation time $T_2$, of the sample resonance, and within which time interval T the sum of all values of $n$ is an even integer (including zero); an illustrative pulse sequence 14, $90°_{90°}-90°_{0°}-90°_{180°}-90°_{0°}-270°_{0°}$, is shown in FIG. 1(c). The $90°_{180°}$ pulse of the sequence is recognized to be equivalent to $-90°_{0°}$ ($n=-1$);

(d), (e), (f) The same as (a), (b), and (c), respectively, except that the initial $90°_{90°}$ pulse 10 is omitted as illustrated in FIGS. 1(d), 1(e), and 1(f); as an example, the pulse train of FIG. 1(d) produces a damped sine wave of the same frequency as the damped cosine wave of FIG. 2(c) which is produced by the pulse train of FIG. 1(a);

(g) The same as (a) through (f) except that the pulse train is replaced by a burst of amplitude and phase modulated radio frequency 15 of period $2\tau$, whose amplitude $2H_1(t)$ satisfies the relations:

(1) The average value, over times large compared to $2\tau$ of the quantity $$\exp 2i\gamma \int_0^{t'} H_1(t') dt' = f(t)$$

approaches zero. $\gamma$ is the gyromagnetic ratio.

(2) The average value of $$\exp i\gamma \int_0^{t'} H_1(t') dt' = g(t)$$

approaches a nonzero constant value.

An example is $H_1(T) = A \cos(\pi t/\tau)$ as shown in FIG. 1(g), where $t$ can have any initial value between 0 and $\tau$, $$f(t) = \exp(2i\gamma A\tau/\pi) \cdot \sin(\pi t/\tau)$$
$$= \sum_{l=-\infty}^{\infty} J_l(2\gamma A\tau/\pi) \cdot e^{il\pi t/\tau}$$

$$g(t) = \sum_{l=-\infty}^{\infty} J_l(\gamma A\tau/\pi) \cdot e^{il\pi t/\tau}$$

Conditions (1) and (2) above are satisfied by adjusting A so that $z = 2\gamma A\tau/\pi$ corresponds to a zero of the Bassel function $J_1(z)$ whereas $z = \gamma A\tau/\pi$ does not.

In methods (a) through (e) above, it is also required that $\tau$ be made of the same order as or smaller than the transverse relaxation time $T_2$ of the resonance being studied. It is not necessary to adjust the carrier phase pulse widths and amplitudes, and timing to exactly the specified values; an approximation is sufficient. The quantity measured (hereafter called the signal) is the nuclear precession signal during the pulse train, observed either directly during the pulse train or as reconstructed from the amplitudes of a set of free induction decay signals following the application of a set of pulse trains of different lengths.

In the limit $\tau \ll T_2$, the signal becomes proportional to the free induction decay that would be observed if the dipolar interactions were absent, except that the time scale of the signal differs from that of the free induction decay by a constant factor characteristic of the particular method, (a) through (e) employed. For methods (a) through (e) this factor is $\sqrt{2}$.

These experiments have in common the fact that the effects of the spin-spin interactions are averaged to a reduced value (approaching zero for $\tau \ll T_2$) whereas the resonance shifts are averaged to a value which does not approach zero. The theoretical explanation of the averaging to zero of the spin-spin interactions is described by Waugh and Wang, Physical Review (1967), for pulse trains similar to method (a) except that there was no phase alternation of the R.F. in the pulse train. The same theory applies to pulse trains described herein. The Waugh-Wang pulse sequence (unlike present methods (a) through (g) however) averages out the resonance shifts as well.

The origin of the effect of pulse trains (a) or (b) can be thought of as follows: the truncated spin-spin and inhomogeneous shift Hamiltonian in the tilted rotating frame is $$V = \sum_{i<j} \sum a_{ij} I_i I_j - 3a'_{ij} I_{zi} I_{zj} + \sum_{i<j} \sum b_{ij}(I_{+i}I_{+j} + I_{-i}I_{-j}) + \sum_i c_i I_{xi} \equiv A + B + C$$

where:

$i, j$ are indices labelling particular spins in the sample,
$a_{ij}$, $a'_{ij}$, $b_{ij}$ are coefficients defining the strength of the dipolar and scalar spin-spin interactions between spins $i$ and $j$, $I_i$ is the dimensionless angular momentum operator for spin $i$; $I_{zi}$ is its $z$-component, $c_i$ is a coefficient defining the resonance shift of spin $i$.

The effect of 90° pulse along the $z$ axis of this frame (corresponding to carrier phase $\pi/2$) is to put the spin system into a state which it would have reached without the pulse at the same time under a Hamiltonian $$V = A - B - \tilde{C}; \quad \tilde{C} = \sum_i c_i I_{yi}$$

Succeeding identical pulses would lead to the cyclic succession of such effective Hamiltonians $$A+B-C,\ A-B-\tilde{C},\ A+B+C\ \ldots$$

Term B, which is responsible for the spin-spin contribution to the free induction decay, has its effects eliminated in the limit $\tau \to 0$ by its alternation in sign. The average effect of the shift term C also vanishes over multiples of four pulses. However, if alternate pulses are applied along the $-z$ axis (carrier phase $-\pi/2$) or are 270° pulses the shift term undergoes the transformations $$C,\ \tilde{C},\ C,\ \tilde{C}\ \ldots$$

and does *not* average out for $\tau \to 0$. The magnetic moment corresponding to $c_i$ undergoes a cumulative precession in the rotating frame, leading to beats with other species $j$ and with the carrier reference in the phase detector.

Figure 2:
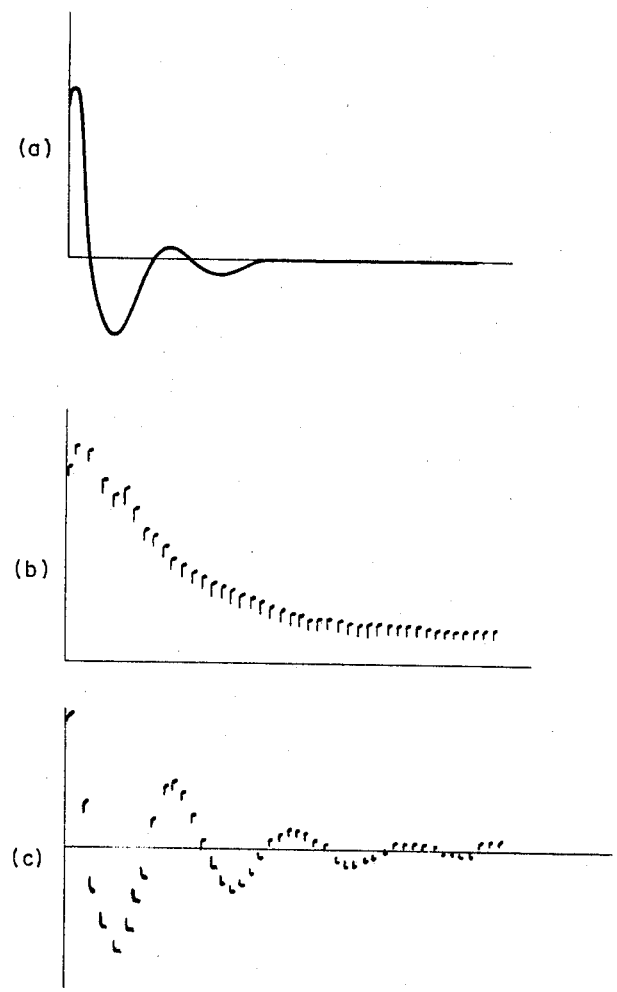
FIGURE 2 shows the output signal from a nuclear resonance spectrometer for a particular solid when different excitation radio frequency pulse trains are used.

FIG. 2 shows a free induction decay in solid hexamethylethane at room temperature. The Zeeman field was set slightly off resonance to produce a beat between the Larmor frequency and the phase detector reference. The frequency of this beat corresponds to the chemical shift of the (equivalent) protons of hexamethylethane relative to the spectrometer frequency. The beat can be seen for only a short time because of the rapid dipolar decay.

The trace of FIG. 2(*b*) shows the result under the same conditions of a modified Carr-Purcell experiment, reported by Ostroff and Waugh, Physical Review Letters 24, 1097 (1966). This experiment used the pulse sequence of an initial 90° pulse followed after a time $\tau$ by a train of pulses of repetition period $2\tau$. The phase of the R.F. carrier in the first pulse differed by 90° from that of the subsequent pulses, and $\tau \ll T_2$. The pulse train is thus that of FIG. 1(*a*) without the phase reversal of alternate pulses subsequent to the first pulse. After an initial transient behavior, not of concern here, the echo envelope decays exponentially with a time constant greater than the relaxation time $T_2$. Although this method eliminated the spin-spin interaction, it unfortunately also eliminated the chemical shift information.

The trace of FIG. 2(*c*) was obtained under the same conditions except that the phase alternation of the pulse train of FIG. 1(*a*) was used. The chemical resonance shift is now observable as the damped oscillatory wave lasting for about 2 milliseconds; this corresponds to an order of magnitude reduction in the effective dipolar broadening.

The traces of FIG. 2 were obtained on a sample of solid hexamethylethane at room temperature whose relaxation time $T_2$ was 100 $\mu$sec. The R.F. pulses were 2.5 $\mu$sec. in width, $\tau = 20$ sec. and the frequency was 15 mHz.

The experiments whose results are shown in FIG. 2(*c*) were made with the Magnion Model ELH–15 NMR spectrometer. This apparatus comes provided with a pulse sequence generator which provides the gating signals to the gated radio frequency source and to a gated phase shifter. The apparatus is capable of being programmed to provide most, if not all, combinations of pulse widths and radio frequency phases heretofore presented in the technical literature as useful sequences for providing information from materials under examination. Even though versatile, the apparatus did not have the capability of providing the pulse sequence of, for example, the sequence of FIG. 1(*a*) (the results of which are shown in FIG. 2(*c*)). It was found necessary to include an additional pulsed phase shifter which was pulsed at the appropriate time by the pulse sequence generator to provide the phase shifted pulses of FIG. 1(*a*). This phase shifter was serially connected between the output of the gate which gates the 7.5 mHz. crystal oscillator and the input of a gated phase shifter, both of which are included in the Magnion spectrometer. The pulsed 180° phase shifter comprised a simple signal switching circuit which provided by virtue of a 90° phase delay in one arm, separate 90° phase shifted 7.5 mHz. signals to individual gates, each of which were gated respectively by one of the two out-of-phase signals of a bistable flip-flop. The state of the flip-flop was controlled by pulses from the Magnion pulse sequence generator. The outputs of the individual channel gates were combined to form a single output having 90° phase shifted signals of gated 7.5 mHz. input signal, the phase being either 0° or 90°, depending upon the state of the flip-flop. The circuit was constructed using Fairchild CT$\mu$L series, Model No. 952, active components to provide the bistable flip-flop, the phase inverter and the gates. The frequency is later doubled in the Magnion spectrometer, so that the 90° phase difference created in this way becomes converted to the desired 180° phase difference. It is apparent that the design of this phase shifter is straight-forward, the design of which the alternatives thereto being obvious to one skilled in the art, and for this reason a drawing of the specific circuit used is not included in this application.

What is claimed is:

1. In the method of operation of a magnetic resonance spectrometer in the study of the resonance of a material where said spectrometer provides a pulsed coherent radio frequency source of energization to said material, the improvement comprising causing said source to provide a train of 90° pulses separated from each other by the time $2\tau$, the phase of the R.F. carrier in each pulse differing from the following pulse by 180°, and $\tau$ is less than the transverse relaxation time $T_2$ of the resonance being studied.

2. The method of claim 1 comprising in addition causing said source to provide a 90° pulse at a time $\tau$ prior to the first pulse of said train and whose R.F. carrier phase is 90° out of phase with the phases of said train of pulses.

3. In the method of operation of a magnetic resonance spectrometer in the study of the resonance of a material where said spectrometer provides a pulsed coherent radio frequency source of energization to said material, the improvement comprising causing said source to provide a train of $n \times 90°$ pulses, where $n$ alternates between two integers which differ from one another by an odd integral multiple of two, said pulses all having the same carrier phase and being separated by a time $2\tau$, where $\tau$ is less than the transverse relaxation time $T_2$ of the resonance being studied.

4. The method of claim 3 comprising in addition causing said source to provide a 90° pulse at a time $\tau$ prior to the first pulse of said train and whose R.F. carrier phase is 90° out of phase with the phase of said train of pulses.

5. In the method of a magnetic resonance spectrometer in the study of the resonance of a material where said spectrometer provides a pulsed coherent radio frequency source of energization to said material, the improvement comprising causing said source to provide a train of $n \times 90°$ pulses, where $n$ varies regularly among a succession of odd positive or negative integral values such that the total time of the pulse train can be divided into time intervals T less than the characteristic transverse relaxation time $T_2$ and within which time interval T the algebraic sum of the values of $n$ is an even integer including zero; a negative value of $n$ is recognized to be equivalent to the corresponding positive value of $n$ together with a carrier phase reversal;

the time separation of the pulses of said train is less than the transverse relaxation time $T_2$ of the resonance being studied, and where the carrier frequency phase of each pulse of said train is in phase with an arbitrary reference phase.

6. The method of claim 5 wherein said train of pulses is preceded at a time $\tau$ by a 90° pulse whose carrier phase is 90° out of phase with the phase of the carrier frequency of the pulse train.

7. In the method of operation of a magnetic resonance spectrometer having a programmable phase and amplitude radio-frequency energization signal, the improvement comprising applying to the sample of material under observation a burst of amplitude and phase modulated carrier radio frequency of period $2\tau$ whose envelope is $2H_1(t)$ where (a) the average value over a time large compared to $2\tau$ of the quantity $$\exp 2i\gamma \int_0^{t_1} H_1(t')dt' = f(t)$$

approaches zero, and (b) the average value of $$\exp i\gamma \int_0^{t_1} H_1(t')dt' = g(t)$$

approaches a nonzero constant value, and where $\tau$ is the same order of magnitude as, or smaller than, the transverse relaxation time $T_2$ of the sample.

8. The method of claim 7 wherein said burst is preceded by a radiofrequency pulse whose phase is 90° out-of-phase with the phase of said burst carrier frequency and whose amplitude and duration produces a 90° rotation of the magnetic moment of the sample.

9. The method of claim 7 wherein said radiofrequency envelope is $H_1(t) = A \cos \pi t/\tau$ where conditions $f(t) = 0$ and $g(t) \neq 0$ are satisfied when the amplitude A is such that the Bessel function $J(2\gamma A\tau/\pi)$ is zero whereas $J(\gamma A\tau/\pi)$ is not zero.

10. The method of claim 9 wherein said burst is preceded by a radio frequency pulse whose phase is 90° out-of-phase with the phase of said burst and whose amplitude and duration produces a 90° rotation of the magnetic moment of the sample.

References Cited

UNITED STATES PATENTS

| | | | |
|---|---|---|---|
| 2,968,762 | 1/1961 | Schuster | 324—0.5 |
| 3,083,335 | 3/1963 | Schuster | 324—0.5 |
| 3,275,931 | 9/1966 | Collins | 324—0.5 |
| 3,358,222 | 12/1967 | Hyde | 324—0.5 |

RUDOLPH V. ROLINEC, Primary Examiner

M. J. LYNCH, Assistant Examiner